US009798145B2

(12) United States Patent
Subramaniam et al.

(10) Patent No.: US 9,798,145 B2
(45) Date of Patent: Oct. 24, 2017

(54) METHOD AND APPARATUS FOR SEE-THROUGH NEAR EYE DISPLAY

(71) Applicant: QUALCOMM Incorporated, San Diego, CA (US)

(72) Inventors: Vijay Subramaniam, San Diego, CA (US); Siva Kiran Chapalamadugu, San Diego, CA (US); Andrew Michael Marschner, Decatur, AL (US); Sherman Sebastian Antao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 14/573,883

(22) Filed: Dec. 17, 2014

(65) Prior Publication Data

US 2015/0338653 A1 Nov. 26, 2015

Related U.S. Application Data

(60) Provisional application No. 62/002,609, filed on May 23, 2014.

(51) Int. Cl.
*G02B 27/01* (2006.01)

(52) U.S. Cl.
CPC .. *G02B 27/0172* (2013.01); *G02B 2027/0118* (2013.01); *G02B 2027/0123* (2013.01); *G02B 2027/0127* (2013.01); *G02B 2027/0178* (2013.01)

(58) Field of Classification Search
CPC ........ G02B 27/0172; G02B 2027/0178; G02B 2027/0118; G02B 2027/0123; G02B 2027/0127
See application file for complete search history.

(56) References Cited

U.S. PATENT DOCUMENTS

| 5,991,085 A | 11/1999 | Rallison et al. |
| 2004/0150758 A1 | 8/2004 | Tomono |

(Continued)

OTHER PUBLICATIONS

International Search Report and Written Opinion—PCT/US2015/030360—ISA/EPO—dated Nov. 5, 2015 (144736WO).

(Continued)

*Primary Examiner* — Towfiq Elahi
(74) *Attorney, Agent, or Firm* — Knobbe, Martens, Olson & Bear, LLP (57) ABSTRACT

Some aspects of the present application include a wearable, see-through display device. The device includes a source of video information and a micro-display configured to receive video information from the source of video information and to project light forming an image based on the video information. The device also includes a lens system comprising one or more lenses, the lens system configured to receive and collimate light from the micro-display and to propagate the light from the micro-display to an image guide and the image guide positioned to receive light from the lens system and direct the received light to a partial reflector. The device also includes a partial reflector configured to reflect the light received from the image guide out of the display device towards a place where an eye of a user wearing the see-through display device may be positioned.

30 Claims, 7 Drawing Sheets

(56) References Cited

U.S. PATENT DOCUMENTS

| | | |
|---|---|---|
| 2009/0099836 A1* | 4/2009 | Jacobsen ............... G06F 17/289 |
| | | 704/3 |
| 2010/0157432 A1 | 6/2010 | Sugihara et al. |
| 2010/0245211 A1 | 9/2010 | Iba et al. |
| 2011/0241975 A1 | 10/2011 | Mukawa et al. |
| 2012/0062445 A1 | 3/2012 | Haddick et al. |
| 2012/0075168 A1 | 3/2012 | Osterhout et al. |
| 2013/0088415 A1* | 4/2013 | Totani ................ G02B 27/0176 |
| | | 345/8 |
| 2013/0107371 A1 | 5/2013 | Devaul |
| 2013/0321378 A1* | 12/2013 | Jamal .................... G09G 3/006 |
| | | 345/212 |
| 2014/0139404 A1 | 5/2014 | Takeda et al. |

OTHER PUBLICATIONS

Partial International Search Report—PCT/US2015/030360—ISA/EPO—dated Aug. 24, 2015 (144736WO).

* cited by examiner

METHOD AND APPARATUS FOR SEE-THROUGH NEAR EYE DISPLAY

CROSS REFERENCE TO RELATED APPLICATIONS

The present application for Patent claims the benefit of Provisional Application No. 62/002,609, titled "METHOD AND APPARATUS FOR SEE-THROUGH NEAR EYE DISPLAY," filed May 23, 2014, which is incorporated by reference herein in its entirety.

TECHNICAL FIELD

The present application relates generally to near eye displays, and more specifically to systems, methods, and devices for see-through near-eye displays for mobile users.

BACKGROUND

See-through near-eye display systems may have a number of different uses. For example, it may be desirable to allow a user to navigate streets without having to look down at the display on his or her mobile phone. It may also be desirable to allow a user to read emails and texts while walking busy city streets or other environments. In order to accomplish these tasks, it may be beneficial to provide a see-through near-eye display which offers an unobstructed view of a user's surroundings, while also allowing the use to consume information from a mobile device, such as maps, augmented-reality pop-ups, and other information. Accordingly, improved see-through near-eye displays are desired.

SUMMARY OF CERTAIN INVENTIVE ASPECTS

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include providing a user with a hands-free see-through display without significantly occluding the view of the user. Such displays allows information to be projected from a mobile device or other medium onto a large virtual screen at some distance in front of the user, and may be coupled or connected to another mobile device, such as a phone, which may remain in a user's pocket, holster, or bag.

One innovation includes a wearable, near-eye see-through display device. The display device may include a housing comprising at least a front portion which may include a nose support. The display device may include a display coupled to a processor and configured to receive image information from the processor and to project light forming an image based on the image information, and an optical system comprising a partially reflective surface, the optical system configured to receive the image from the display and provide the image to the reflective screen, the reflective screen disposed in a position to reflect the image to a viewing point such that the image is visible in a side portion of the field-of-view of a user's eye that is located at the eye point, the side portion of the field-of-view being distal to the center of the front portion or the housing.

In some embodiments, the optical system may further include a lens system comprising one or more lenses, the lens system configured to receive and collimate light forming the image from the display and to propagate the light forming the image from the display to an image guide; and the image guide positioned to receive the image from the lens system and to transmit the image from the lens system to the reflective screen. In some embodiments the lens system is configured to collimate light such that the image will appear to be from a source three or more meters away. In some embodiments, the image guide comprises an acrylic image guide which operates based on total internal reflection. The partially reflective surface may be positioned such that the image received from the image guide will have a vertical offset of between zero (0) and minus twenty-five degrees (−25) degrees to a center of the image. In some embodiments, the partially reflective surface is positioned such that the image received from the image guide will have a vertical offset of between minus five (−5) degrees and minus twenty (−20) degrees.

In some embodiments of the near-eye display device, the partially reflective surface may be positioned such that the image received from the image guide will have a vertical offset of between five (5) and thirty-five (35) degrees to a center of the image. In some embodiments, the partially reflective surface is positioned such that the image received from the image guide will have a horizontal offset of between ten (10) and thirty (30) degrees. In some embodiments, the partially reflective surface is positioned such that the image received from the image guide will have a horizontal offset of between fifteen (15) and twenty-five (25) degrees. In some embodiments, the partially reflective surface is positioned such that the image received from the image guide will have a horizontal offset of approximately twenty (20) degrees.

The near-eye display device may be configured to be wirelessly connected to a mobile device, and the processor is configured to receive the image information from the mobile device. In some embodiments, the display comprises an organic light emitting diode display. In some embodiments, the lens system is configured to collimate light such that the light will appear to be from a source approximately three meters away. In some embodiments, the partially reflective surface is configured to be partially transparent and to reflect approximately 25%-75% of light. In some embodiments, the partially reflective surface is configured to be partially transparent and to reflect approximately 50% of light.

Another innovation includes a method of providing visual information to one or both eyes of a user by a wearable display device. The method may include receiving information in the form of image data or video data from a source of information, projecting light, using a micro-display, forming an image based on the received video information, collimating light from the micro-display, using a lens system, and propagating the light from the micro-display to an image guide, receiving the light from the lens system, using the image guide, and directing the light to a partial reflector, and reflecting the light received from the image guide, using the partial reflector, out of a see-through display device towards a place where an eye of a user wearing the display device may be positioned, such that the light is projected with a horizontal offset between five (5) and thirty-five (35) degrees to the center of the light, and with a vertical offset between zero (0) and minus twenty-five (−25) degrees to the center of the light. In some embodiments, the source of video information comprises an applications processor board. In some embodiments, receiving video information from a source of video information comprises receiving video information from a mobile device, via a wireless connection to the mobile device. The micro-display may include an organic light emitting diode display. In some embodiments, the lens system is configured to collimate light such that the light will appear to be from a source approximately three meters away. In some embodiments, the collimated light such that the light will appear to be from a source three or more meters away.

One aspect of the present disclosure provides a wearable display device. The device includes a housing comprising at least a front portion having a center, a display panel disposed in the housing, the display panel configured to display image information, a processor in electronic communication with the display panel, the processor configured to provide the image information to the display panel, and an optical system including an image guide including a receiving surface disposed facing the display panel, and an emitting surface disposed facing interior to the housing, the image guide positioned to receive light representative of the image information from the display panel on the receiving surface, the image guide configured to propagate light received from the display through the image guide and towards the front portion of the housing, an at least partially reflective surface positioned to reflect light propagating through the image guide towards the light guide emitting surface such that the reflected light exits the image guide through the emitting surface in a direction towards a viewing eye point such that the image information is visible in a side portion of the field-of-view of a user's eye that is located at the eye point, the side portion of the field-of-view being distal to the center of the front portion of the housing.

In some aspects, the optical system further includes a lens system including one or more lenses disposed between the display panel and the image guide, the lens system configured to receive and collimate light from the display panel and to propagate the light from the display to the image guide. The optical system may be configured to provide light at the eye point for viewing by a user's eye such that the image information appears to be from a source three or more meters away. The image guide may include an acrylic image guide which operates based on total internal reflection. The partially reflective surface may be positioned to provide the image information to a user's eye positioned at the eye point with a vertical offset of between 0 degrees and −25 degrees relative to the center of the FOV of a user's eye positioned at the eye point. For example, the partially reflective surface may be positioned to provide the image information to a user's eye positioned at the eye point with a vertical offset of between −5 degrees and −20 degrees relative to the center of the FOV of a user's eye positioned at the eye point. In some aspects, the partially reflective surface may be positioned to provide the image information to a user's eye positioned at the eye point with a vertical offset of between 5 and 35 degrees relative to the center of the FOV of a user's eye positioned at the eye point. For example, the partially reflective surface may be positioned to provide the image information to a user's eye positioned at the eye point with a horizontal offset of between 10 and 35 degrees relative to the center of the FOV of a user's eye positioned at the eye point. In some aspects, the partially reflective surface is positioned to provide the image information to a user's eye positioned at the eye point with a horizontal offset of between 15 and 25 degrees relative to the center of the FOV of a user's eye positioned at the eye point. For example, the partially reflective surface may be positioned to provide the image information to a user's eye positioned at the eye point with a horizontal offset of about 20 degrees relative to the center of the FOV of a user's eye positioned at the eye point. The device may also include a transceiver configured to communicate with a wireless mobile device, and the processor may be configured to receive information for displaying on the display panel from the mobile device. The display panel may include an organic light emitting diode display. The partially reflective surface may be configured to be partially transparent and to reflect approximately 25%-75% of light. The partially reflective surface may be configured to be partially transparent and to reflect approximately 50% of light.

One aspect of the present disclosure provides a method of providing image information to a user's eye located at an eye point of a wearable display device. The method includes providing image information from a processor, displaying the image information on a display panel such that light indicative of the image information is projected towards a front portion of the wearable display device, and, using an optical system, collimating light from the display panel and propagating the collimated light through an image guide. The method further includes reflecting the light received from the image guide by a partial reflective surface positioned to reflect light propagating through the image guide towards a light guide emitting surface of the image guide such that the reflected light exits the light guide through the emitting surface in a direction towards a viewing eye point such that the image information is visible in a side portion of the field-of-view of a user's eye that is located at the eye point, the side portion of the field-of-view being distal to a center of the front portion of the housing.

One aspect of the present disclosure provides a wearable display device, which includes means for providing image information. The device further includes means for displaying the image information such that light indicative of the image information is projected towards a front portion of the wearable display device, means for collimating light from the displaying means and propagating the collimated light through means for guiding the light, and means for reflecting the light received from the light guiding means, the reflecting means positioned to reflect light propagating through the light guiding means in a direction towards a viewing eye point such that the image information is visible in a side portion of the field-of-view of a user's eye that is located at the eye point, the side portion of the field-of-view being distal to a center of the front portion of the housing.

In one aspect, a wearable display device is disclosed. The device includes a housing comprising at least a front portion having a center, a micro-display disposed in the housing, and a processor in electronic communication with the micro-display, the processor configured to provide the image information to the micro-display. The device further includes an optical system configured to reflect light indicative of image information towards a viewing eye point such that the image information is visible in a side portion of the field-of-view of a user's eye that is located at the eye point the side portion of the field-of-view being distal to the center of the front portion of the housing.

One aspect of the present disclosure provides a method of providing image information to a user's eye located at an eye point of a wearable display device. The method includes providing image information from a display panel to a viewing eye point such that the image information is visible in a side portion of the field-of-view of a user's eye that is located at the eye point, the side portion of the field-of-view being distal to a center of a front portion of a housing of the wearable display device. In some aspects, the image information may be provided to a user's eye positioned at the eye point with a vertical offset of between 0 degrees and −25 degrees relative to the center of the FOV of a user's eye positioned at the eye point, and the partially reflective surface may be positioned to provide the image information to a user's eye positioned at the eye point with a horizontal offset of between 10 and 35 degrees relative to the center of the FOV of a user's eye positioned at the eye point.

DETAILED DESCRIPTION

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
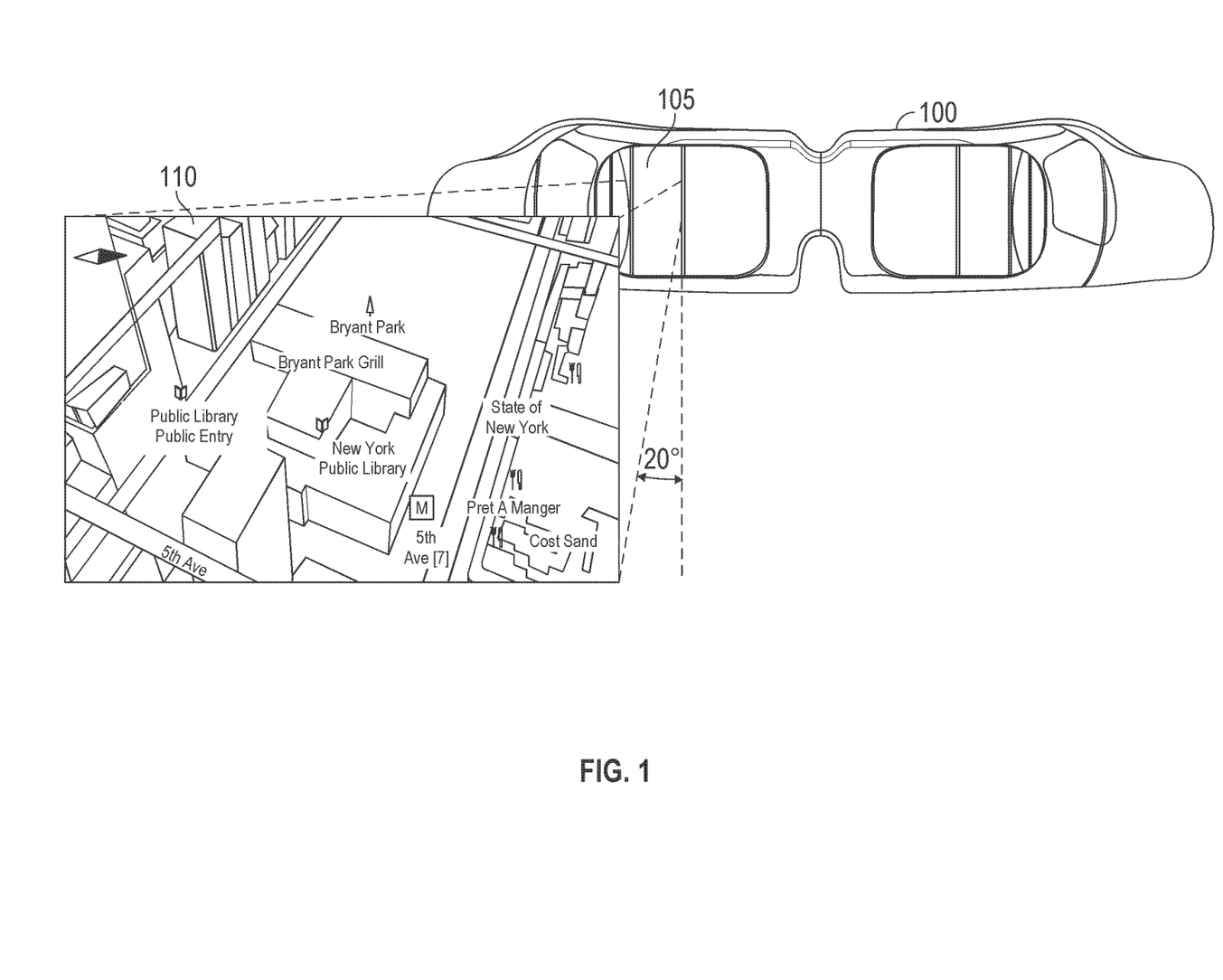
FIG. 1 is a front elevation view of an example of a see-through, near-eye display system, and illustrates map information which may be viewed on the display system.

FIG. 1 illustrates one embodiment of a front view of an exemplary configuration of a see-through near-eye display system 100, and illustrates an example of information 110 (in this case map information) which may be viewed using the near-eye display system 100. The near-eye display system 100 includes an optical display system 105 (illustrated and further described below, for example, in FIG. 3) that provides optical information that is viewable by a user (or wearer) of the near-eye display system 100. In the embodiment illustrated in FIG. 1, the near-eye display system 100 is configured in a shape similar to that of eyeglasses or sunglasses. That is, the housing of the near-eye display system 100 may be in the shape of eyeglasses or sunglasses. However, many other configurations are possible. In examples of other embodiments, a near-eye display system 100 may be configured to include, or be partially or fully housed in or attached to, a visor, a helmet, a hat, and/or a single-lens eyeglass-style device. In other embodiments, the near-eye display system 100 may be configured to attach to a helmet, eyeglasses, visor or other type of head-worn gear that positions the near-eye display system 100 to provide information via an optical display system 105 to an eye of a user wearing the near-eye display system 100. The near-eye display system 100 may be a standalone device, or it may be connected to a user's mobile device either wirelessly or by a wired connection. Examples of mobile devices that the near-eye display system 100 can be connected to include but are not limited to a tablet computer, a cellular telephone or other communication device, a watch, or another mobile device. In some embodiments the near-eye display system 100 can be connected to automobile computer system, an airplane computer system and/or other computers (for example, a desktop computer).

The optical display system 105 allow users to view information which is projected onto at least a portion of a partial reflector 340 (FIG. 3) of the optical display system 105. For example, this information may include, for example, navigation-related data (including but not limited to maps, turn-by-turn written directions, GPS data and pseudo or actual satellite imagery), text messages, emails, videos, images, real-time video or images, Internet content, games, or specific information related to a location of the optical display system 105 or instructions provided by a user. Accordingly, the optical display system 105 may be used for navigation, entertainment, to browse the Internet, play games, or to view any other content that may be displayed on a computer screen and allow a user wearing the optical display system 105 sufficient visibility of the surroundings while walking through city streets and generally interacting with people and the surrounding environment. The information displayed by the optical display system 105 may be perceived by a user to be semi-transparent, and may be placed in a user's field-of-view (FOV) in a location other than the FOV of a user who is looking straight ahead. This allows a user to continue interacting with his or her surroundings while also viewing information on the optical display system 105, for example to view turn-by-turn navigation or to view text messages or email.

The near-eye display system 100 may be coupled to a mobile device (for example, a mobile phone, tablet, watch, or earphones) wirelessly or via a wired connection. For example, near-eye display system 100 may be connected to a mobile device using a technology such as a Bluetooth or an IEEE 802.11 (Wi-Fi) standard. For example, the near-eye display system 100 may be connected to a mobile device using a peer-to-peer wireless standard such as Miracast, which may allow a connection between the near-eye display system 100 and the mobile device with necessitating the use of an access point or other intermediary between the two. In some embodiments, the near-eye display system 100 may also be a stand-alone device that is configured for communicating data, for example, via Wi-Fi and/or cellular protocols and communication systems.

Still referring to FIG. 1, the near-eye display system 100 may include a curved frame (or housing) which may be configured to wrap around a portion the head of a user, or may be configured to wrap around the entire head of a user. A curved frame may offer a number of advantages over blockier frames of previous wearable computing devices. A curved frame may be more styling and attractive than other frames, and have a more desirable appearance, such as appearing more similar to sunglasses or other eyeglasses. A curved frame may be easier to put on and to take off. A curved frame design may also be easier to store than other headset configuration.

The near-eye display system 100 may be configured to display information to one eye, providing a monocular view of information, and may be provided to either the left or right eye of a user. In some other embodiments, the near-eye display system 100 can be configured to provide information to both the left and right eyes of a user. In such embodiments, components of the optical display system 105 shown in FIG. 3 may be partially or fully replicated to provide information to both the left and right eyes of a user. In some embodiments, a monocular design may allow an individual to have a better view of his or her surroundings than a binocular design, may be less expensive than a binocular design, and also may allow more space on a near-eye display system 100 for other components (e.g., one or more processor, memory, communication components, audio components, tactile or sensory components including but not limited to vibration components or moving components) in a portion of the headset. For example, in a monocular system, certain components (such as projection components) could be disposed on one side of the display system 100, while other components (such as processors or memory) could be disposed on the other side.

The embodiment of the optical display system 105 (further illustrated and described in reference to FIGS. 2A and 3) also may include an image guide configured to receive light containing information from an image source and propagate the light to a (at least partially) reflective screen, which reflects the light towards an area where the eye of a user of display system 100 would be. For example, the reflective screen can be a partial reflector that reflects the light into a portion of a field of view that can be seen by a user of the display system 100. Accordingly, reflective screen reflects the light that it receives from the light guide such that it is projected towards the eye of user at an angular such that it appears to be on the side of the field of view of one eye of a user away. This may help to reduce occlusion of events happening in front of the user by information provided by the optical display system 105. The optical display system 105 may provide information in color, and may include, for example, an OLED display, for lower power consumption. In various embodiments, the configuration of the optical display system 105 may place the field of view of information provided to a user's eye at an angular offset of one (1) to forty-five (45) degrees from a direct forward view direction of a user's eye, which for description purposes is indicated to be at zero (0) degrees offset. For example, the angular offset may be configured to be at an angle within the range of one (1) to forty-five (45) degrees from a direct forward view direction of a user's eye. In the illustrated embodiment of FIG. 1, the offset is 20 degrees. In other words, the optical display system 105 may be configured to present information to the eye such that it appears to the eye that it is coming from a direction having (about) a 20 degree offset from a straight-ahead direction.

In some embodiments, the optical display system 105 can be adjusted, or receive input to be adjusted, to provide the information to the eye at an angle desired by the user. In some examples, the information may be and this may be presented 20 degrees off to the right or left side of the near-eye display system 100. For example, it may be advantageous if the information is presented to the side of a user's view, rather in the center of a user's view. If the monocular system is projecting for a left eye, the projected image may be offset to the left side of the user's view. Presenting this information on the side may allow a user to see in front of himself or herself without difficulty, while also being able to look at information from the near-eye display system 100 when desired. In some aspects, this information may also be, for example, in a range of about 15 or 25 degrees from the center of a user's vision. Such an angle may allow the information presented on the display 110 to not significantly impact a user's field of vision, while still being visible to the user with little effort or eye strain.

In some aspects, the near-eye display system 100 may present information to a user at a level that is slightly below the horizon. For example, the near-eye display system 100 may present information to a user's eye that is perceived to be below a plane that represents a level horizontal view of a user that is looking out straight-ahead through the near-eye display system 100. In some embodiments, the horizon angle that the near-eye display system 100 provides information may be adjusted. This angle, of below the horizon, may be the most comfortable angle for an individual's eyes to focus on, and thus may also reduce eye strain when using the near-eye display system 100. For example, in various embodiments a near-eye display system 100 is configured to provide information to a user's eye that is in the range of 0-45 degrees below the horizon of a user's view. In some embodiments, the information is presented in a range just below the horizon, for example, at an angle of 0-20 degrees below the horizon of a user's viewpoint. Accordingly, the information provided by the on the near-eye display system 100 may be disposed in a position where the image is out of the way, but easy to see and focus on when needed, with minimal eye strain.

Figure 2A:
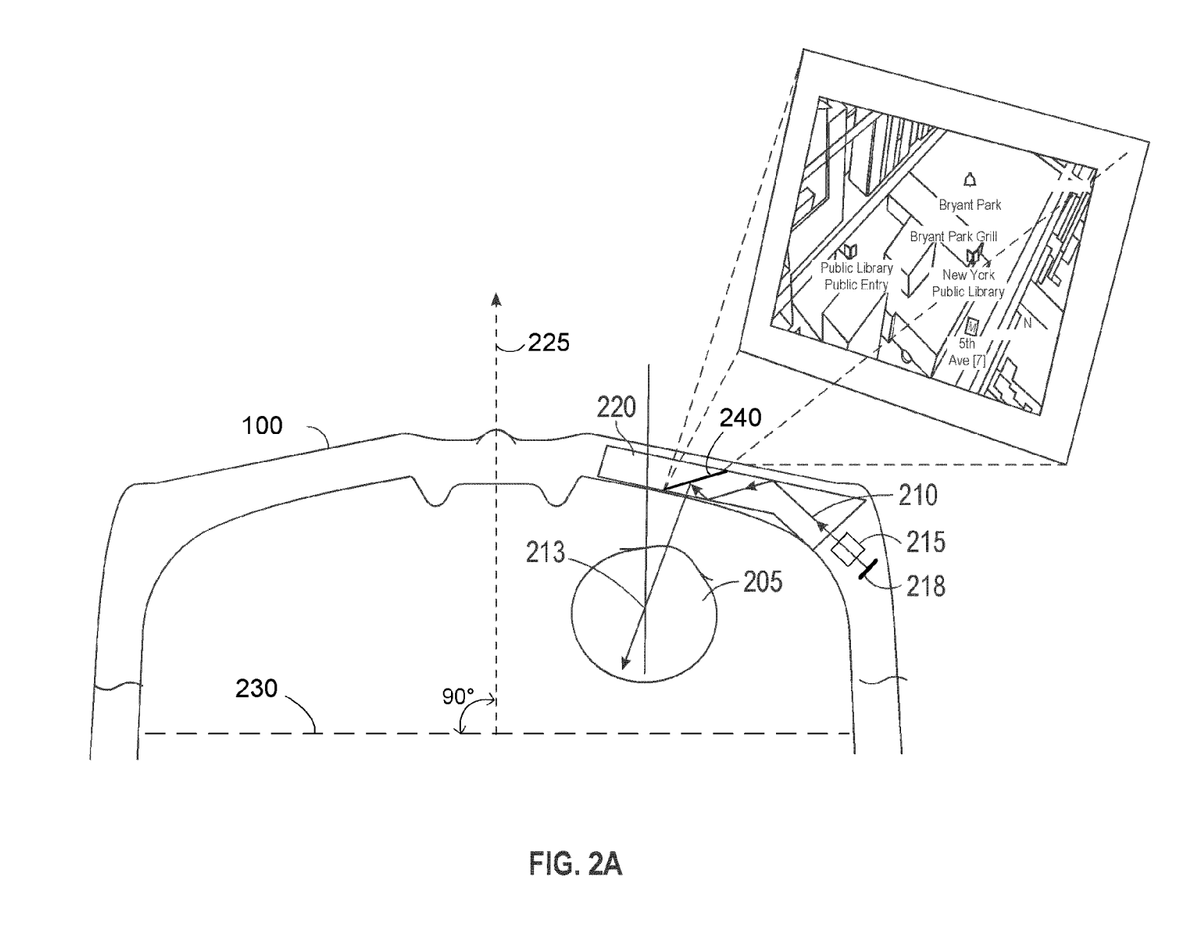
FIG. 2A is a top-view of an example of a see-through, near-eye display system, and illustrates map information which may be viewed on the display system.

FIG. 2A is another illustration of an example embodiment of a see-through, near-eye display system 100, including certain components of the near-eye display system 100. As illustrated in this embodiment, the near-eye display system 100 includes a display panel 218 that is configured to display received information. The display panel (micro-display) 218 is in communication with a processor or a display engine (not shown) that is configured to provide information to the display panel 218. In particular, FIG. 2A illustrates optical components to guide light 210 from an image on a micro-display 218, through a lens assembly 215 and into an image guide 220, and then ultimately be provided to the eye 205 of user. The light from a micro-display 218 may travel through the image guide 220 using total internal reflection (TIR). A partial reflector 240 is positioned to receive light from the image guide 220 and reflect received light to a viewing eye point 213 where a user's eye 205 is positioned when the user is wearing the near-eye display system 100. The partial reflector 240 may be an at least partially reflective surface. In some embodiments, the partial reflector 240 is not transparent and/or not translucent, for example, it may be a highly reflective or mirror surface (or a mirror). In various embodiments, the partial reflector 240 may sometimes be, and may generally be referred to as, a "screen" or an "optical component" or an "optical element"—in each case it includes at least one at least partially reflective surface. The partial reflector 240 may be positioned to provide optical information from the micro-display 305 (FIG. 3) to the eye 205 at an offset from a straight-ahead looking direction of the eye 205, for example, at a 20 degree angle offset from the center of a user's vision. The partial reflector 240 may also be positioned to provide optical information from the micro-display 305 (FIG. 3) to the eye 205 such that it is perceived by the user below the user's visual horizon, that is, from an angle that is below a horizontal plane of vision of the user when the user is looking in a horizontal direction through the near-eye system 100. Although FIG. 2A depicts information being presented to the right eye of a user, the near-eye system 100 can also be configured similarly to present information to the right eye of a user, or to both, in various embodiments.

Orientation of the display system 100 may be characterized by a display system horizontal axis. As illustrated in FIG. 2, the display system horizontal axis 225 as defined here is directed straight ahead from the front of the display system 100, as illustrated by the "zero degree" arrow 225 of the display system horizontal axis. In other words, the display system horizontal axis 225 is an axis of the near-eye display system 100 that is extends from the front of the near-eye display system 100 in a level horizontal plane that bi-sects the near-eye display system, and that also contains lateral axis 230 that is in a level plane and perpendicular to horizontal axis 225. Generally, display system horizontal axis zero degree arrow 225 may correspond with a "straight-ahead" direction of a user who is wearing the display system (depending on exactly how the near-eye display system is oriented on a user's head or positioned in front of a user's eye(s)). Accordingly, in some aspects, the partial reflector 240 may be positioned such that light from the display system 100 is directed at an angle that is between 0 and 90 degrees (in an outward direction, depending on which eye piece of the display system 100 is used to display information) from the display system horizontal axis. For example, this angle may be between 5 and 35 degrees. In some aspects, the angle between the display system horizontal axis and the light from the partial reflector 240 may be to the center of the image from the partial reflector 240. For example, the image from the partial reflector itself may take up some angular range. Accordingly, the partial reflector 240 may be configured such that light from the partial reflector 240 is offset from the display system horizontal axis by approximately 20 degrees, to the center of the image from the partial reflector 240.

Figure 2B:
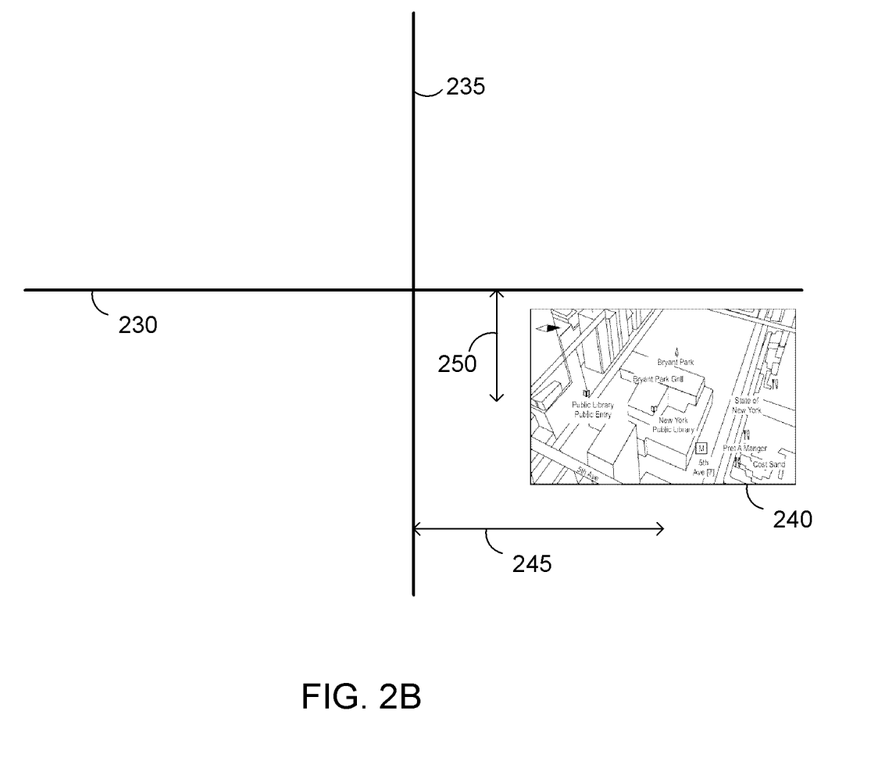
FIG. 2B is an illustration of a display system horizontal axis and a display system vertical axis.

FIG. 2B is an illustration of an embodiment of the display system horizontal axis 230 and a display system vertical axis 235. As illustrated here, both of the axes lines are drawn at zero degrees, or the center of the axes, such that the intersection of line 235 and line 230 may be thought of as being the center of a field of vision of a user of the display system. In some aspects, positive angles on the display system vertical axis 235 may correspond with objects which are above a "horizon" of a user wearing the display system 100, such that a user may have to move his or her eyes to look upward to view items at a positive angle on the display system vertical axis 235. As illustrated here, an image 240 from the display system 100 may be projected into the field of vision of the glasses. This image 240 may have a horizontal offset 245 from the center of the display system horizontal axis 230. The image 240 may have a vertical offset 250 from the center of the display system vertical axis 235, as well. Both of these offsets may be measured from the center of the respective axes, and to the center of the image 240.

In some embodiments, the horizontal offset 245 may be between 0 and 90 degrees, measure outward from the center of the display system 100. That is, the horizontal offset 245 may be such that the image 240 appears to the outside of a user's field of vision. Accordingly, if the display system 100 is projecting an image 240 to a user's right eye, the horizontal offset 245 will cause the image 240 to be on the right side of the display system horizontal axis 230, while if the display system 100 is projected into the left lens, the horizontal offset 245 will cause the image 240 to be on the left side of the display system horizontal axis 230. In some aspects, the horizontal offset 245 may be such that the image 240 does not overlap the center of the display system horizontal axis 230. In some aspects, the horizontal offset 245 may be between 5 and 35 degrees, 15 and 25 degrees, 10 and 30 degrees, or may be approximately 20 degrees.

Similarly, the vertical offset 250 may be between 0 and -90 degrees, where a positive vertical offset 250 is "upwards" and a negative vertical offset 250 is "downwards." For example, the vertical offset 250 may be such that the entire image 240 appears below the zero degree "horizon." In some aspects, the vertical offset 250 may be approximate 5, 10, 15, or 20 degrees. In some aspects, a negative vertical offset 250 may reduce eye strain of a user who is wearing the display system 100. Accordingly, in some aspects, from a user's point of view, the user may look downwards from the horizon in order to view image 240.

Figure 3:
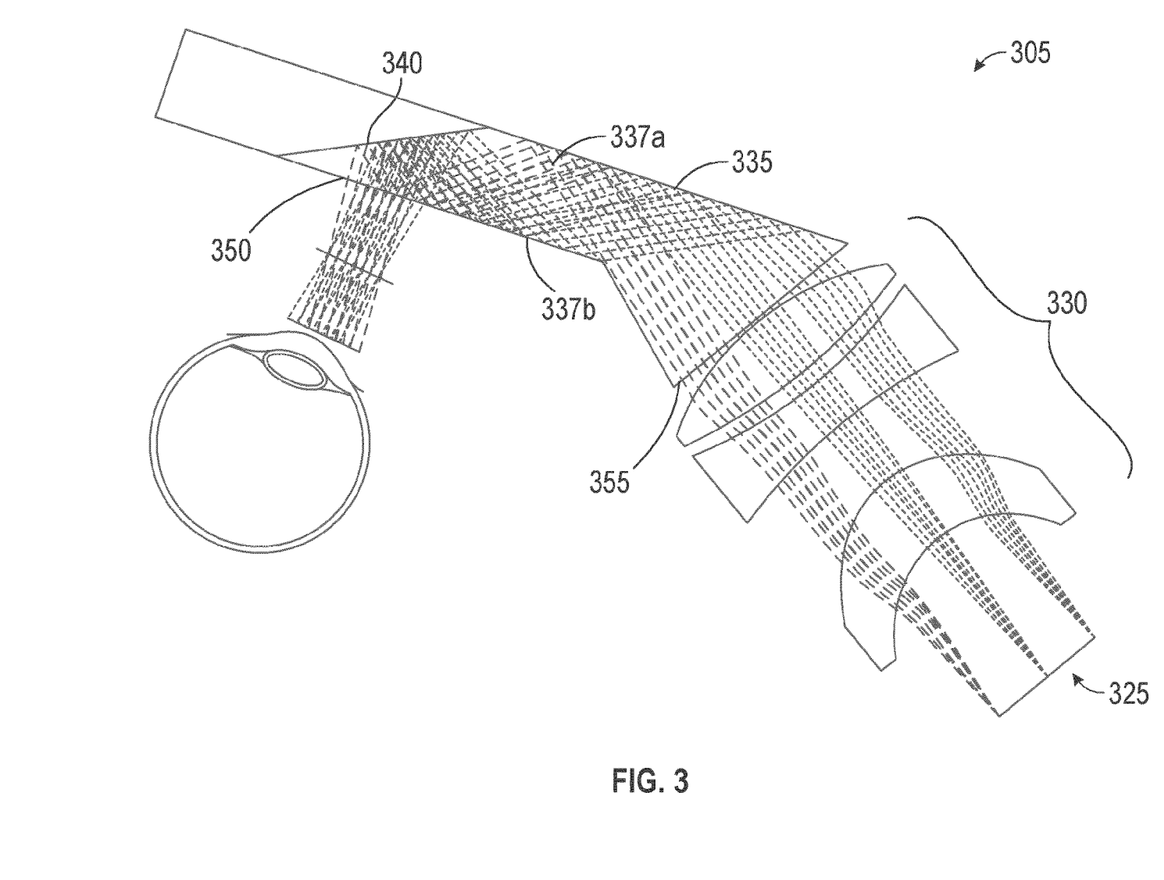
FIG. 3 is a plan view schematic of an example of some components that may be included in a see-through, near-eye display system, and illustrates an example of paths that light that may propagate from a micro-display of the display system to a partial reflector, positioned in front of a user's eye and offset at an angular distance from a direct view direction of the user's eye.

FIG. 3 is a plan view schematic of an example of some components that may be included in an optical display system 105 of a see-through, near-eye display system 100. The optical display system 105 may include a micro-display panel ("micro-display") 325 that displays information, a lens stack 330 that receives light from the micro-display 325 and propagates and focuses the received light, and an image guide 335 that receives light from the lens stack 330. The optical display system 105 also includes a reflector 340 that receives light from the image guide 335 and reflects the received light out of the near-eye display system 100, for example, towards the eye of a user wearing the near-eye display system 100.

In some embodiments, the micro-display 325 may have a resolution of 1024×768 (XGA). Other resolutions may also be used, such as 854×480. The micro-display 325 may have a brightness of 250 Nits ($cd/m^2$), or may be brighter than this, such as 1500 Nits. Other levels of brightness may also be used. The micro-display 325 may display images using 24-bit color, and may have a field of view of about 19 degrees, or another size. In some aspects, having a large field of view may be made possible by the design of the optics and image guide. This may allow the field of view to be larger than 15 degrees. The optical display system 105 may use any suitable type of display technology for the micro-display 325, such as an LCD (liquid crystal display) display, an LED (light emitting diode) display, or another display. In some aspects, an OLED (organic light emitting diode) display may be used. An OLED display panel used as the micro-display 325 may have lower power consumption than certain other types of displays, such as LCD displays. An OLED display may also offer color with high saturation and contrast, relative to other types of displays. However, one potential drawback of some display panels (for example, an OLED display) may be that the display is not as bright as other displays. This drawback may be mitigated by, for example, shielding the user from a certain amount of ambient light. For example, a display panel that is not as bright may be more visible when used with tinted glasses such as sunglasses, which block a higher proportion of ambient light than more transparent glass. FIG. 3 also illustrates an example of paths that light that may propagate from the micro-display 325 of the display system to the reflector 340 which may be positioned in front of a user's eye and offset at an angular distance from a direct view direction of the user's eye. In some aspects, the device may have a power consumption of 1 W or less using various power saving techniques and low-power consumption components. For example, power consumption may be reduced using one or more techniques for reducing brightness, adjusting refresh rate, implementing standby modes and sleep modes, any of which may be user controlled or dynamically controlled. In some embodiments, the device may consume 500 mW.

The micro-display 325 may be connected to an application processor (not shown in FIG. 3), which is used to generate optical information which is then conveyed through the optical display system 105. In some embodiments the application processor may be disposed anywhere on the near-eye display system 100, for example, in the housing of the near-eye display system 100 on either side of the partial reflector 340. In some embodiments, the application processor may be external to the near-eye display system 100. The micro-display 325 may be connected to a processor through a wireless or wired interface, for example, a MIPI interface. The processor and/or a display driver can provide data to the micro-display 325 to display. In some aspects, the application processor may allow the device to receive phone calls, and to activate a voice-initiated phone dialer.

Light from the micro-display 325 may be collimated using lens stack 330 which can comprise of one or more lenses. The optical display system 105, and in particular the lens stack 330, is configured to provide optical information that can be perceived by a user to be at a certain distance from the user. The optical information may be provided to appear at one of a range of distances, for example, at a distance that is comfortable for the user to view repeatedly. In some embodiments, the distance can be adjusted by the user, for example, by adjusting (for example, moving) one or more of the components of the optical display system. For example, in some embodiments, the optical display system 105 may provide optical information as an image that will appear to be 3 meters (or about 9 feet) from a user's eye. Other distances, such as 4 meters (or about 12 feet) may also be used. In some aspects, it may be easier for a user to focus on the optical information if the optical information appears to be more distant. However, this may require a trade-off in the size of the device, and lenses to make the light appear further away may require more space than those needed for closer distances. For example, a distance of about 9 feet or 12 feet may be an appropriate trade-off between the distance of the image that will be comfortable and easy to focus on, and the size of the lens stack 330.

The rays of the collimated image may be provided into the image guide 335 from a receiving surface 355 of the image guide 335 disposed facing the lens stack 330 and the display 325, as illustrated in FIG. 3. Such embodiments may provide advantages over other configuration. for example, providing light into a receiving surface of the image guide 335 may allow for the device to be smaller, or may allow for more desirable curved-frame designs. The light (light rays of the collimated image) propagate through the image guide 335, reflecting off of the surfaces 337a, 337b of the image guide 335 using the principles of total internal reflection (TIR). The angle of the rays may be chosen such that all the rays will reflect off the inside surface of the image guide 335 at least once as using TIR.

The image guide 335 is disposed to receive light from the lens stack 330. The image guide may be glass or plastic. In some aspects, plastic or acrylic may be preferred over glass due of its lower weight. The partial reflector 340 may be a dichroic formed by two portions of the image guide 335 and is configured to reflect optical information from the micro-display 325 out of the optical display system 105, for example, towards the eye of a user wearing the near-eye display system 100. The partial reflector 340 is also configured to allow a user to see through the partial reflector 340. In some aspects, the image guide 335 may be made of two or more pieces of acrylic, such as one piece for each of the two sides of the image guide. These pieces may be fused together to form a single image guide 335.

The angle of the reflector 340 may be chosen such that the image is placed off of the main direct view by a certain angle. For example, the image may be presented to a user at an angle of 20 degrees from a user's view when looking forwards. Presenting this information on the side of a user's vision may allow the user to use the display without undesirably occluding their vision. In some aspects, the partial reflector surface 340 may have different reflective properties. For example, the partial reflector 340 may allow approximately 25% to 75% of light through, or approximately 50% of outside light through, and may reflect 50% of light. This may allow the image from the micro-display 325 to be visible to a user with about 50% transparency. Alternatively, the partial reflector 340 may also reflect other amounts, such as 70% or 30% of light, which would alter the transparency of the micro-display 325 image to a user accordingly. In some aspects, the partial reflector 340 may be at least partially shaded for external light as well. As noted above, this may allow the image from the micro-display 325 to appear relatively brighter, even when using a display technology, for example, an OLED display, that is not inherently as bright as certain other display technologies.

Figure 4:
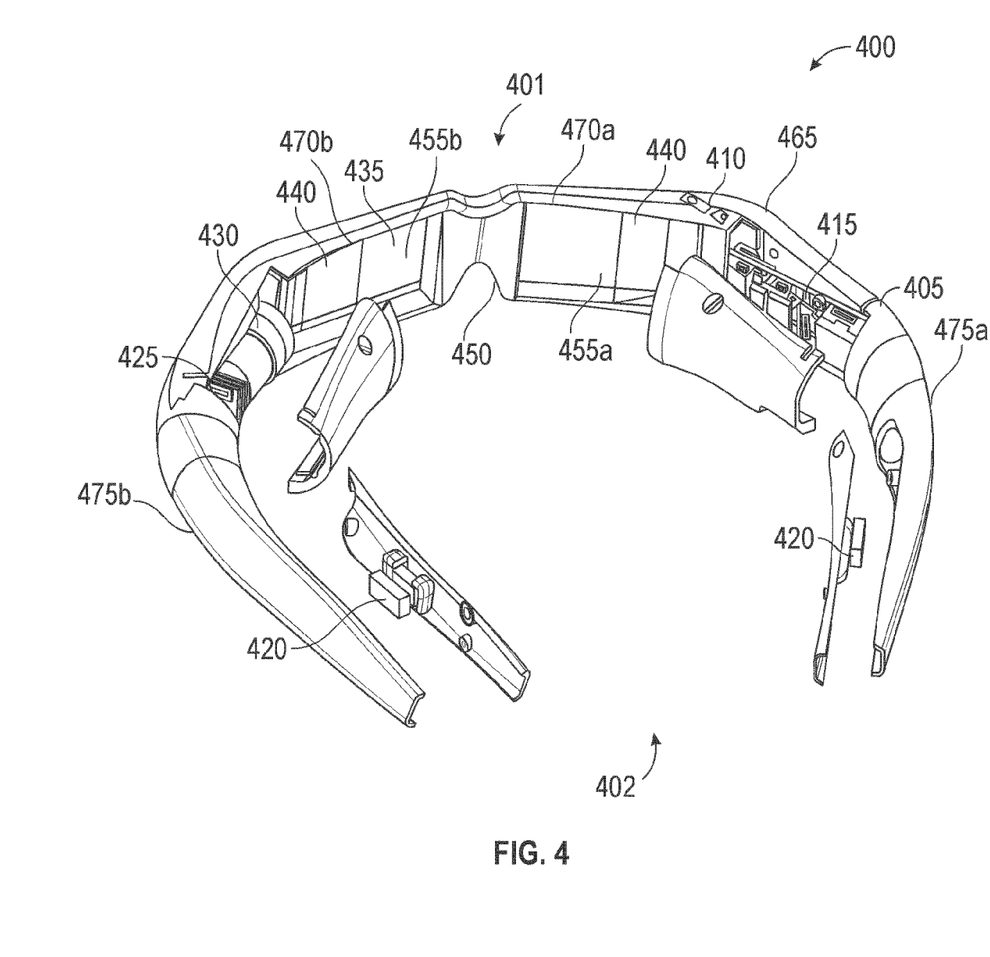
FIG. 4 is a rear view of an example of a see-through, near-eye display system illustrating certain components of the display system.

FIG. 4 illustrates a rear view of an example of an embodiment of a see-through, near-eye display system 400 which illustrates certain components of the near-eye display system. The near-eye display system 400 includes a housing 465 that components of the near-eye display system 400 are coupled to and/or contained within. The housing 465 may include a front portion 401 that may include a support 450 disposed in the center of the front portion 401. The support 450 may be configured to rest on or near the nose of a user and as illustrated may disposed centered in the front of the near-eye display system 400. In some embodiments, the support 450 includes a curved surface (for example, as shown to fit around a portion of a nose) at least a portion of which may rest against the nose of a user. In some embodiments, the support may is not configured to fit around the nose but instead rest on the nose, or on another portion of a user's face or head to support the near-eye display system 400. The near-eye display system 400 may include a right view port 455*a* and a left view port 455*b*, each positioned in corresponding right aperture 470*a* and left aperture 470*b* of the housing 465. As illustrated, the nose support 450 is disposed between the right view port 455*a* and the left view port 455*b*. Each view port 455*a*, 455*b* is positioned to allow a user wearing the near-eye display system 400 to see through the corresponding right and left apertures 470*a*, 470*b* of the housing 465.

In the illustrated embodiment, the housing 465 includes a right support 475*a* left support 475*b* that that extend away from the front portion 401 of the near-eye display system 400 towards a rear portion 402 of the near eye display system 400. The right support 475*a* and left support 475*b* are configured to comfortably rest on the head and/or ears of a user wearing the near-eye display system 400. In some embodiments, the near-eye display system 400 may not include a left or a right support, instead having only a front portion 401 to provide the image information to a user's left or right eye, for example, where the near-eye display system 400 is configured to attach to a hat or another item.

The near-eye display system 400 includes a micro-display 425 that is configured to display information. Information on the display 425 is projected through a lens assembly 430, and through an image guide 435. This information is then reflected towards the user's eye, using a partial reflector 440. The partial reflector 440 may be disposed in the image guide 435. The near-eye display system 400 may be configured to provide (or project) an image to one or both of the partial reflectors 440, according to various embodiments. In FIG. 4, the micro-display 425 is illustrated on the left side of the near-eye display system 400. Accordingly, in this embodiment, the image from the micro-display would be provided for the left eye of a user.

In some embodiments, the near-eye display system 400 may be configured to work with either eye, or it may be constructed so that a given near-eye display system 400 may only be used for a particular eye. In some embodiments, a near-eye display system may also be configured such that the micro-display 425, a lens assembly 430, an image guide 435, and a partial reflector 440 may be on the right side and the image accordingly on the right side of the near-eye display system 400. For example, an individual may wish to use a near-eye display system 400 that allows their dominant or better eye to use the display. In some embodiments, the image may be projected on to either side (or both) of the user's field of view, and on either (or both) the left or right side of the near-eye display system 400. The near-eye display system 405 may include an integrated application processor 415 to drive the display and to process the content that is displayed on the display. The near-eye display system 400 may also include integrated Bluetooth and Wi-Fi capability, for wireless connectivity. The near-eye display system 400 may include speakers 420 and may also include a microphone.

Figure 5:
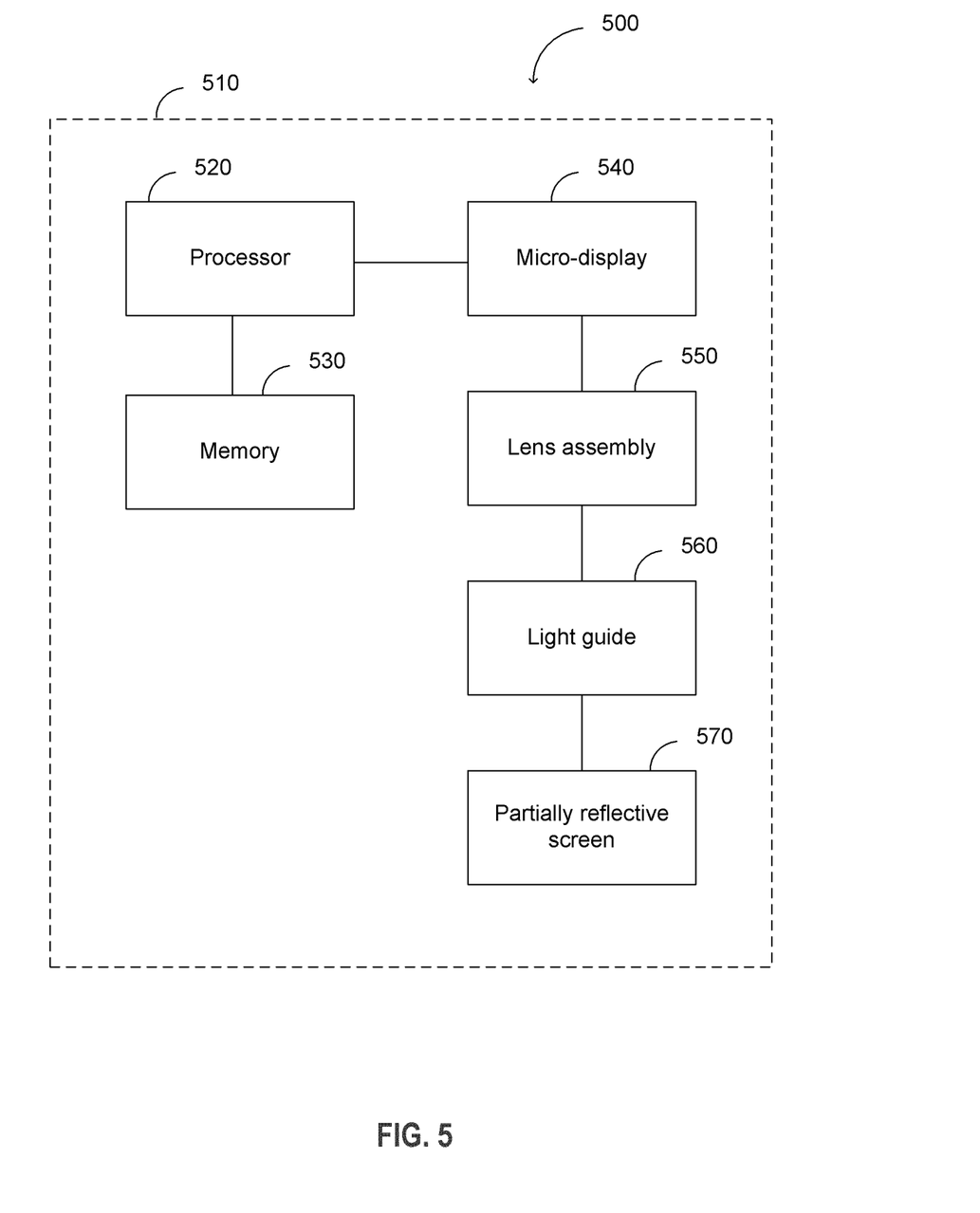
FIG. 5 is an illustration of a see-through, near-eye display system according to some aspects of the present disclosure.

FIG. 5 is an illustration of an embodiment of a see-through, near-eye display system 500 according to some aspects of the present disclosure. The display system 500 may include a housing 510, which may contain any number of the other components. For example, the housing 510 may contain all the other components, or certain components may be includes outside of the housing. In same aspects, the housing 510 may be formed to look like eye glasses.

The display system 500 may include a processor 520. This processor may be operably attached to memory 530, such as either volatile or non-volatile memory (or both). The processor 520 may be configured to, for example, receiving information from another device, such as a cellular phone, and to transmit that information to the micro-display 540, in order to generate images. Accordingly, the processor 520 may be operably connected to a micro-display 540. The micro-display 540 may be configured to receive information from the processor 520, such as image or other information that may allow the micro-display 540 to generate light which forms images. For example, the micro-display 540 may include a number of pixels in a grid pattern, and may have a resolution of, for example, 1024×768 (XGA). Other resolutions may also be used. The images from the micro-display 640 may be transmitted to through a lens assembly 550. The lens assembly 550 may include one or more lenses, and may be configured to collimate the images from the micro-display 540, and to direct those images through a light guide 560. The light guide 560 may include a transparent material, which functions using total internal reflection (TIR). The images from the micro-display 640 may propagate through the light guide 560, and may then be re-directed towards an eye of a user by the partially reflective surface 570 (for example reflector 340 FIG. 1). This screen may be only partially reflective, in order to allow a user of the display system 500 to see through the screen 570. Thus, images created by the micro-display 540 may be visible to a user on the partially reflective surface 570, but may be semi-transparent, because the screen 570 is partially reflective. Accordingly, a user may be able to view both the image from the micro-display 640 as well as view objects (in the user's surroundings) which may be positioned behind the image.

Figure 6:
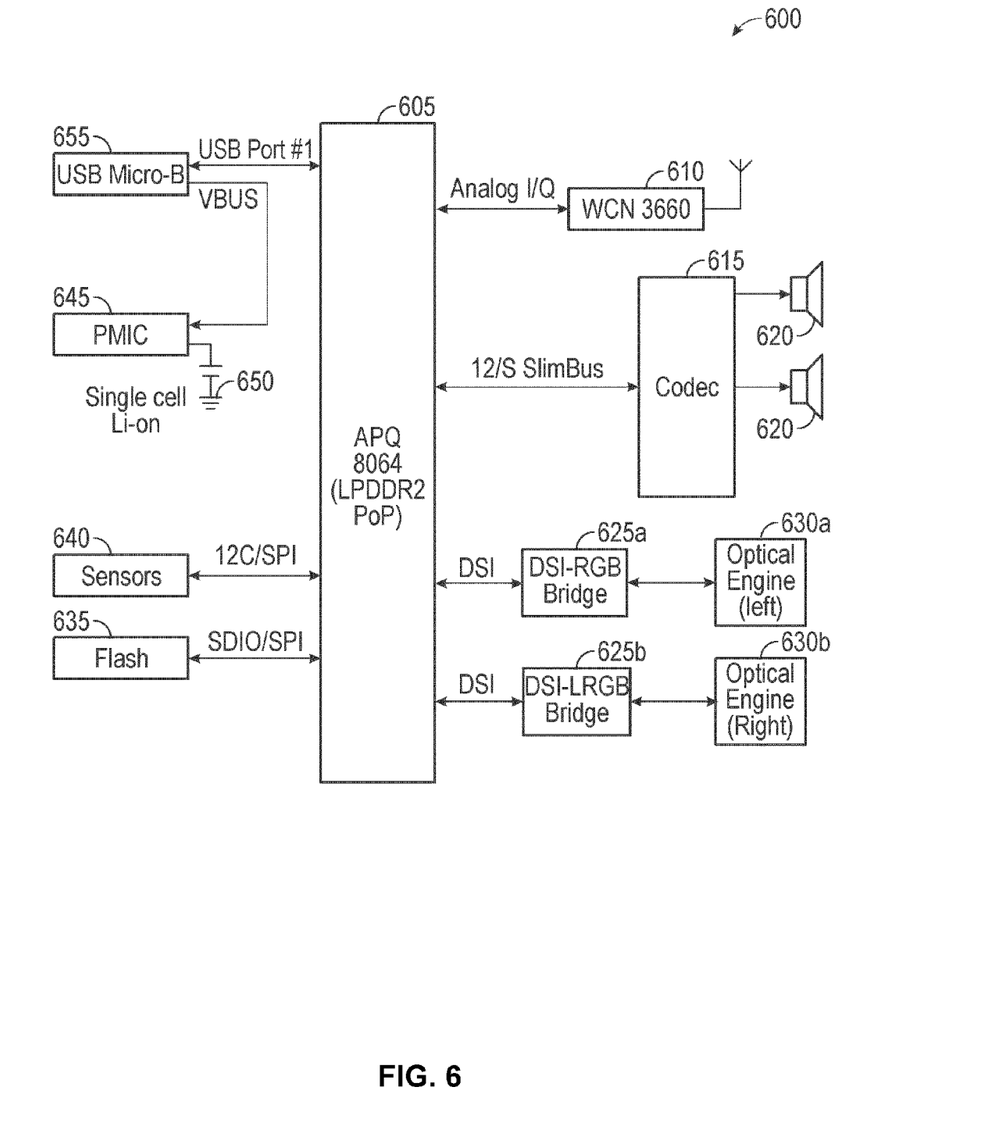
FIG. 6 is a schematic diagram of certain components of a see-through, near-eye display system.

FIG. 6 is a schematic diagram that illustrates exemplary components that may be included in a see-through, near-eye display system 600. For example, the near-eye display system 600 may include the wireless display engine having a baseband and display chip 605, for example, the Qualcomm APQ8064 (Snapdragon S4 Pro). This chip may have a relative small footprint, at 14×14 mm. This chip also has integrated POP mobile DDR2 memory, an integrated Wi-Fi modem, an integrated MDP display driver, a Krait processor, and dual MIPI DSI display interfaces. The near-eye display system 600 may also include a wireless local area network (WLAN) transceiver 610, for example, the Qualcomm QCN3660. This transceiver 610 may include a highly-integrated radio frequency (RF) module. The near-eye display system 600 may further include a power management IC 645, such as a Qualcomm PM8921 chip. This power management IC 645 may be attached to a battery, such as a single-cell Lithium ion battery 650, and may be attached to the baseband and display chip 605 through a USB Micro-B interface 655.

In some aspects, certain portions illustrated in this diagram may be external to the glasses-like shape of the near-eye display system 600. For example, the battery may be external to the glasses, and may be, for example, worn by the user elsewhere on his or her body. Placing certain portions of the near-eye display system 600 disposed external to the headset portion of the device (or a housing of the device) may allow the headset portion of the near-eye display system 600 to be smaller or lighter, or offer better battery life, than may otherwise be possible. The near-eye display system 600 may also include an audio codec, which may be attached to one or more speakers 620. For example, as illustrated, two speakers 620 may be used for stereo sound.

The near-eye display system 500 may also include a DSI-RGB bridge 625*a*, 625*b* for each of the left optical engine 630a and right optical engine 630b. The device may further include a bootable flash memory 635. The device may also include a number of sensors 540. For example, the device may include sensors 640 including an accelerometer and a gyroscope. Other sensors 640 may include a camera, a touch sensor, a compass, or a GPS sensor. These sensors 640 may allow the device to receive various types of inputs from the external environment, and may allow the device to present different information to users, or enable different types of user interfaces.

It should be understood that any reference to an element herein using a designation such as "first, "second," and so forth does not generally limit the quantity or order of those elements. Rather, these designations may be used herein as a convenient wireless device of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the figures may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display device, comprising:
a housing comprising at least a front portion having a center, a left support and a right support, the left and right support extending from the front portion;
a display panel disposed in the housing, the display panel configured to display image information;
a processor in electronic communication with the display panel, the processor including a display driver integrated in the processor, the display driver configured to provide the image information to the display panel;
a transceiver in the wearable display device and coupled to the processor, the transceiver configured such that the wearable display device is operable as a stand-alone communication device for communicating data via a communications protocol;
an optical system comprising
an image guide including
a receiving surface disposed facing the display panel, and
an emitting surface disposed facing interior to the housing,
the image guide positioned to receive light representative of the image information from the display panel on the receiving surface, the image guide configured to propagate light received from the display panel through the image guide and towards the front portion of the housing; and
an at least partially reflective surface positioned to reflect light propagating through the image guide towards the light guide emitting surface such that the reflected light exits the image guide through the emitting surface in a direction towards a viewing eye point such that the image information is visible in a side portion of the field-of-view (FOV) of a user's eye that is located at the eye point, the side portion of the FOV being distal to the center of the front portion of the housing,
wherein the partially reflective surface is positioned to provide the image information to the user's eye positioned at the eye point with a vertical offset of between 0 degrees and −25 degrees relative to the center of the FOV of the user's eye positioned at the eye point.

2. The wearable display device of claim 1, wherein the optical system further comprises a lens system comprising one or more lenses disposed between the display panel and the image guide, the lens system configured to receive and collimate light from the display panel and to propagate the light from the display to the image guide.

3. The wearable display device of claim 1, wherein the optical system is configured to provide light at the eye point for viewing by the user's eye such that the image information appears to be from a source three or more meters away.

4. The wearable display device of claim 1, wherein the image guide comprises an acrylic image guide which operates based on total internal reflection.

5. The wearable display device of claim 1, wherein the partially reflective surface is positioned to provide the image information to the user's eye positioned at the eye point with a vertical offset of between −5 degrees and −20 degrees relative to the center of the FOV of the user's eye positioned at the eye point.

6. The wearable display device of claim 1, wherein the transceiver is configured to communicate with a wireless mobile device, and wherein the processor is configured to receive information for displaying on the display panel from the mobile device.

7. The wearable display device of claim 1, wherein the display panel comprises an organic light emitting diode display.

8. The wearable display device of claim 1, wherein the partially reflective surface is configured to be partially transparent and to reflect approximately 25%-75% of light.

9. The wearable display device of claim 1, wherein the partially reflective surface is configured to be partially transparent and to reflect approximately 50% of light.

10. A wearable display device, comprising:
a housing comprising at least a front portion having a center, a left support and a right support, the left and right support extending from the front portion;
a display panel disposed in the housing, the display panel configured to display image information;
a processor in electronic communication with the display panel, the processor including a display driver integrated in the processor, the display driver configured to provide the image information to the display panel;
a transceiver in the wearable display device and coupled to the processor, the transceiver configured such that the wearable display device is operable as a stand-alone communication device for communicating data via a communications protocol;
an optical system comprising
an image guide including
a receiving surface disposed facing the display panel, and
an emitting surface disposed facing interior to the housing,
the image guide positioned to receive light representative of the image information from the display panel on the receiving surface, the image guide configured to propagate light received from the display panel through the image guide and towards the front portion of the housing; and
an at least partially reflective surface positioned to reflect light propagating through the image guide towards the light guide emitting surface such that the reflected light exits the image guide through the emitting surface in a direction towards a viewing eye point such that the image information is visible in a side portion of the field-of-view (FOV) of a user's eye that is located at the eye point, the side portion of the FOV being distal to the center of the front portion of the housing, wherein the partially reflective surface is positioned to provide the image information to the user's eye positioned at the eye point with a vertical offset of between 5 and 35 degrees relative to the center of the FOV of the user's eye positioned at the eye point.

11. The wearable display device of claim 10, wherein the partially reflective surface is positioned to provide the image information to the user's eye positioned at the eye point with a horizontal offset of between 10 and 35 degrees relative to the center of the FOV of the user's eye positioned at the eye point.

12. The wearable display device of claim 11, wherein the partially reflective surface is positioned to provide the image information to the user's eye positioned at the eye point with a horizontal offset of between 15 and 25 degrees relative to the center of the FOV of the user's eye positioned at the eye point.

13. The wearable display device of claim 12, wherein the partially reflective surface is positioned to provide the image information to the user's eye positioned at the eye point with a horizontal offset of about 20 degrees relative to the center of the FOV of the user's eye positioned at the eye point.

14. The wearable display device of claim 10, wherein the transceiver is configured to communicate with a wireless mobile device, and wherein the processor is configured to receive information for displaying on the display panel from the mobile device.

15. A method of providing image information to a user's eye located at an eye point of a wearable display device, the method comprising:
receiving image information via a transceiver in the wearable display device, the transceiver configured to operate as a stand-alone communication device for communicating data via a communications protocol;
providing the image information from display driver integrated into a processor of the wearable display device, the display driver configured to provide the image information to a display panel positioned in a support of the wearable display device extending from a front portion of the wearable display device;
displaying the image information on a display panel such that light indicative of the image information is projected towards the front portion of the wearable display device;
using an optical system, collimating light from the display panel and propagating the collimated light through an image guide; and
reflecting the light received from the image guide by a partial reflective surface positioned to reflect light propagating through the image guide towards a light guide emitting surface of the image guide such that the reflected light exits the light guide through the emitting surface in a direction towards a viewing eye point such that the image information is visible in a side portion of the field-of-view (FOV) of the user's eye that is located at the eye point, the side portion of the FOV being distal to a center of the front portion of the housing, wherein the partially reflective surface is positioned to provide the image information to the user's eye positioned at the eye point with a vertical offset of between 0 degrees and −25 degrees relative to the center of the FOV of the user's eye positioned at the eye point.

16. The method of claim 15, wherein the partially reflective surface is positioned to provide the image information to the user's eye positioned at the eye point with a vertical offset of between −5 degrees and −20 degrees relative to the center of the FOV of the user's eye positioned at the eye point.

17. The method of claim 15, wherein the partially reflective surface is positioned to provide the image information to the user's eye positioned at the eye point with a horizontal offset of between 10 and 35 degrees relative to the center of the FOV of the user's eye positioned at the eye point.

18. The method of claim 17, wherein the partially reflective surface is positioned to provide the image information to the user's eye positioned at the eye point with a horizontal offset of between 15 and 25 degrees relative to the center of the FOV of the user's eye positioned at the eye point.

19. The method of claim 17, wherein the partially reflective surface is positioned to provide the image information to the user's eye positioned at the eye point with a horizontal offset of about 20 degrees relative to the center of the FOV of the user's eye positioned at the eye point.

20. The method of claim 15, wherein the partially reflective surface is configured to be partially transparent and to reflect approximately 25%-75% of light.

21. The method of claim 15, wherein the optical system is configured to provide light at the eye point for viewing by the user's eye such that the image information appears to be from a source three or more meters away.

22. A method of providing image information to a user's eye located at an eye point of a wearable display device, the method comprising:
receiving image information via a transceiver in the wearable display device, the transceiver configured to operate as a stand-alone communication device for communicating data via a communications protocol;
providing the image information from display driver integrated into a processor of the wearable display device, the display driver configured to provide the image information to a display panel positioned in a support of the wearable display device extending from a front portion of the wearable display device;
displaying the image information on a display panel such that light indicative of the image information is projected towards the front portion of the wearable display device;
using an optical system, collimating light from the display panel and propagating the collimated light through an image guide; and
reflecting the light received from the image guide by a partial reflective surface positioned to reflect light propagating through the image guide towards a light guide emitting surface of the image guide such that the reflected light exits the light guide through the emitting surface in a direction towards a viewing eye point such that the image information is visible in a side portion of the field-of-view (FOV) of the user's eye that is located at the eye point, the side portion of the FOV being distal to a center of the front portion of the housing,
wherein the partially reflective surface is positioned to provide the image information to the user's eye positioned at the eye point with a vertical offset of between 5 and 35 degrees relative to the center of the FOV of the user's eye positioned at the eye point.

23. A wearable display device, comprising:
a front portion;
a support extending from the front portion, the support configured to rest on the head or ear of a user wearing the display device;

means for displaying image information such that light indicative of the image information is projected towards the front portion of the display device, the means for displaying positioned in the support;

a transceiver configured to communicate with a communications protocol such that the wearable display device is operable as a stand-alone communication device for communicating data via the communications protocol to receive the image information;

a processor in electronic communication with the transceiver and the displaying means, the processor including a display driver, integrated into the processor, and configured to provide the image information to the displaying means, and means for collimating light from the displaying means and propagating the collimated light through means for guiding the light; and means for reflecting the light received from the light guiding means, the reflecting means positioned to reflect light propagating through the light guiding means in a direction towards a viewing eye point such that the image information is visible in a side portion of the field-of-view (FOV) of a user's eye that is located at the eye point, the side portion of the FOV being distal to a center of the front portion of the housing, wherein the reflecting means is positioned to provide the image information to the user's eye positioned at the eye point with a vertical offset of between 0 degrees and −25 degrees relative to the center of the FOV of the user's eye positioned at the eye point.

24. The wearable display device of claim 23, wherein the displaying means comprises a micro-display panel, the light collimating means comprises a lens assembly, the light guiding means comprises an image guide, and the reflecting means comprise a partially reflective surface.

25. The wearable display device of claim 23, wherein the reflecting means is positioned to provide the image information to the user's eye positioned at the eye point with a horizontal offset of between 10 and 35 degrees relative to the center of the FOV of the user's eye positioned at the eye point.

26. The wearable display device of claim 23, wherein the transceiver is configured to communicate with a wireless mobile device, and wherein the processor is configured to receive information for displaying on the display panel from the mobile device.

27. A wearable display device, comprising:

a housing comprising at least a front portion having a center, a left support and a right support, the left and right support extending from the front position;

a micro-display disposed in the housing;

a processor in electronic communication with the micro-display, the processor including a display driver integrated in the processor and configured to provide the image information to the micro-display;

a transceiver in the wearable display device and coupled to the processor, the transceiver configured such that the wearable display device is operable as a stand-alone communication device for communicating data via a communications protocol; and an optical system comprising an at least partially reflective surface, the optical system configured to reflect light indicative of image information towards a viewing eye point such that the image information is visible in a side portion of the field-of-view of a user's eye that is located at the eye point the side portion of the field-of-view being distal to the center of the front portion of the housing, wherein the at least partially reflective surface is positioned to provide the image information to a user's eye positioned at the eye point with a vertical offset of between 0 degrees and −25 degrees relative to the center of the field-of-view (FOV) of the user's eye positioned at the eye point, and wherein the partially reflective surface is positioned to provide the image information to a user's eye positioned at the eye point with a horizontal offset of between 10 and 35 degrees relative to the center of the FOV of the user's eye positioned at the eye point.

28. The wearable display device of claim 27, wherein the optical system comprises:

an image guide having a receiving surface disposed facing the micro-display and an emitting surface disposed facing interior to the housing, and a lens system comprising one or more lenses disposed between the display panel and the image guide, the lens system configured to receive and collimate light from the display panel and to propagate the light from the micro-display to the image guide receiving surface.

29. The wearable display device of claim 27, wherein the transceiver is configured to communicate with a wireless mobile device, and wherein the processor is configured to receive information for displaying on the display panel from the mobile device.

30. A wearable display device, comprising:

a front portion;

a support extending from the front portion, the support configured to rest on the head or ear of a user wearing the display device;

means for displaying image information such that light indicative of the image information is projected towards the front portion of the display device, the means for displaying positioned in the support;

a transceiver configured to communicate with a communications protocol such that the wearable display device is operable as a stand-alone communication device for communicating data via the communications protocol to receive the image information;

a processor in electronic communication with the transceiver and the displaying means, the processor including a display driver, integrated into the processor, and configured to provide the image information to the displaying means, and means for collimating light from the displaying means and propagating the collimated light through means for guiding the light; and means for reflecting the light received from the light guiding means, the reflecting means positioned to reflect light propagating through the light guiding means in a direction towards a viewing eye point such that the image information is visible in a side portion of the field-of-view (FOV) of a user's eye that is located at the eye point, the side portion of the FOV being distal to a center of the front portion of the housing, wherein the partially reflective surface is positioned to provide the image information to the user's eye positioned at the eye point with a vertical offset of between 5 and 35 degrees relative to the center of the FOV of the user's eye positioned at the eye point.

* * * * *